United States Patent
Vogt et al.

(10) Patent No.: US 12,465,984 B2
(45) Date of Patent: Nov. 11, 2025

(54) LUBRICANT FLOW CONTROL MANAGEMENT FOR SAW GUIDES

(71) Applicant: Precision Guide Machinery and Repair Limited, Prince George (CA)

(72) Inventors: Nalynd Vogt, Prince George (CA); Carrick Bergen, Prince George (CA); Nathan Pacholko, Prince George (CA)

(73) Assignee: Precision Guide Machinery and Repair Limited, Prince George (CA)

( * ) Notice: Subject to any disclaimer, the term of this patent is extended or adjusted under 35 U.S.C. 154(b) by 297 days.

(21) Appl. No.: 17/550,209

(22) Filed: Dec. 14, 2021

(65) Prior Publication Data

US 2022/0184720 A1   Jun. 16, 2022

Related U.S. Application Data

(60) Provisional application No. 63/125,051, filed on Dec. 14, 2020.

(51) Int. Cl.
*B23D 59/02* (2006.01)
*B27B 7/04* (2006.01)
*F16N 7/00* (2006.01)

(52) U.S. Cl.
CPC .............. *B23D 59/025* (2013.01); *B27B 7/04* (2013.01); *F16N 7/00* (2013.01); *F16N 2280/04* (2013.01); *Y10T 83/263* (2015.04); *Y10T 83/8878* (2015.04)

(58) Field of Classification Search
CPC .... B23D 47/005; B23D 59/02; B23D 59/025; Y10T 83/263; Y10T 83/8878; B27B 5/34
USPC .............................. 83/22, 169, 171, 821, 824
See application file for complete search history.

(56) References Cited

U.S. PATENT DOCUMENTS

| | | | | |
|---|---|---|---|---|
| 3,750,503 A | * | 8/1973 | McMillan ............ | B23D 59/025 83/16 |
| 4,567,798 A | * | 2/1986 | Brdicko ................... | B26D 7/10 83/171 |
| 4,635,513 A | * | 1/1987 | McGeehee ........... | B23D 47/005 83/171 |

(Continued)

OTHER PUBLICATIONS

A. Mohammadpanah, "Circular Saw Passive Flow Valve", FPInnovations, Mar. 2019, 14 pages.

*Primary Examiner* — Laura M Lee
(74) *Attorney, Agent, or Firm* — Daylight Law, P.C.

(57) ABSTRACT

A saw guide for a saw arbor guide assembly comprises a head, a body, and one or more passages. The head has one or more intake channels adapted to supply lubricant to the saw guide. The body is connected to the head, with the body located between adjacent ones of the saw blades. The body has first and second faces, with the body further having a plurality of lubricant openings located on one or both of the first and second faces for supplying the lubricant to the saw blades. The passages extend through the head and the body and connect each of the intake channels with the lubricant openings, with the passages configured to carry lubricant from the one or more intake channels to the lubricant openings. For each of the lubricant openings, a flow control valve is located in the passage proximate to the lubricant opening to control a flow of lubricant through the lubricant opening. The flow control valves are configured to differentially control the flow of lubricant to the lubricant openings.

18 Claims, 7 Drawing Sheets

(56) References Cited

U.S. PATENT DOCUMENTS

| | | | | |
|---|---|---|---|---|
| 4,715,254 A * | 12/1987 | DeGan | B23D 59/02 | 83/171 |
| 4,848,200 A * | 7/1989 | McGehee | B23D 47/005 | 83/171 |
| 4,961,359 A * | 10/1990 | Dunham | B23D 47/005 | 83/171 |
| 5,159,866 A * | 11/1992 | Dunham | B23D 47/005 | 83/824 |
| 5,809,859 A * | 9/1998 | Stroud | B23D 47/005 | 83/508.3 |
| 5,921,162 A * | 7/1999 | Jackson | B23D 47/005 | 83/508.3 |
| 6,050,163 A * | 4/2000 | Gravely | B23D 59/02 | 83/171 |
| 6,755,102 B2 * | 6/2004 | Buchanan | B27B 7/04 | 83/13 |
| 7,584,688 B1 * | 9/2009 | Tegen | B23D 47/02 | 83/820 |
| 2001/0037715 A1 * | 11/2001 | McGehee | B27B 7/04 | 83/829 |
| 2003/0140751 A1 * | 7/2003 | McGehee | B23D 47/005 | 83/169 |
| 2005/0011328 A1 * | 1/2005 | McGehee | B27B 7/04 | 83/523 |
| 2016/0008897 A1 * | 1/2016 | McGehee | B23D 59/02 | 83/22 |
| 2019/0337064 A1 * | 11/2019 | Stroud | B23D 47/005 | |
| 2022/0097155 A1 * | 3/2022 | Vogt | G01K 13/08 | |
| 2022/0143860 A1 * | 5/2022 | Burmester | B27B 17/12 | |
| 2022/0184720 A1 * | 6/2022 | Vogt | B23D 59/025 | |
| 2023/0173595 A1 * | 6/2023 | Vogt | B27B 5/34 | 83/471 |
| 2023/0173598 A1 * | 6/2023 | Vogt | B23D 47/005 | 83/169 |

* cited by examiner

LUBRICANT FLOW CONTROL MANAGEMENT FOR SAW GUIDES

FIELD OF THE INVENTION

This application claims the benefit of U.S. Provisional Patent Application No. 63/125,051 filed Dec. 14, 2020, the contents of which are hereby incorporated by reference.

FIELD OF THE INVENTION

The present invention relates to lubricant flow control, and in particular, to lubricant flow control for saw guides in gang saws.

BACKGROUND OF THE INVENTION

In a typical gang saw, a plurality of parallel circular saw blades is mounted on a rotating arbor to form a gang saw assembly. A saw guide assembly is provided for each gang saw assembly. The saw guide assembly comprises a plurality of saw guides attached to a guide post. The saw guides and the saw blades are configured such that each saw blade engages the saw guide assembly in between two adjacent saw guides. The saw blades rotate at high speeds in order to cut logs into individual boards.

During operation, the saw blades may get quite hot. If a saw blade becomes too hot, there may be very adverse consequences to the general state of the equipment (i.e. the saw blades and/or the saw guides may become damaged) and to the quality of the resulting lumber product. In particular, high temperatures for extended periods of time may result in earlier than expected failure of the saw blades and/or the saw guides.

In order to provide cooling and general lubrication to the saw blades, it is typical to provide lubricants to the saw blades and/or the saw guides. Lubricants may include air, oil, water, or a mixture of air, oil and/or water. These lubricants are typically supplied through channels or pathways formed within the saw guides. However, because of the geometry of the individual saw guides and the relative arrangement of the saw guides, there may be an uneven or insufficient supply of lubricant to different portions of the gang saw, thereby reducing the effectiveness of the cooling.

It is therefore one objective of the invention to provide a more effective and efficient lubricant supply for the gang saw.

SUMMARY OF THE INVENTION

In accordance with one embodiment of the invention, a saw guide in a saw arbor guide assembly comprises an intake channel for supplying lubricant to the saw guide. The saw guide comprises a head and a body, with the body comprising first and second faces. Passages are formed within the saw guide for carrying the lubricant to lubricant openings on one or both of the first and second faces. Flow control valves are located at or proximate to the lubricant openings to control and limit the flow of lubricant out of the lubricant openings. The flow rate for the flow control valves may be calibrated to provide differing flows of lubricant to different portions of the saw guide.

During operation of the saw arbor guide assembly, the portion of the saw blade that is closer to its outer edge is generally hotter than the portion of the saw blade that is closer to its center. Consequently, it is preferable that more lubricant be supplied to the portion of the saw blade closer to the outer edge. By calibrating the flow rate of the flow control valves, it is possible to adjust the flow of lubricant to provide more lubricant to the portion of the saw blade closer to the outer edge.

Alternatively, the flow control valves may be calibrated to provide an even flow of lubricant from each of the lubricant openings on the saw guide.

In another embodiment of the invention, a saw guide is provided for a saw arbor guide assembly that has an arbor, a plurality of saw blades rotating about the arbor, and a guide post. The saw guide comprises a head, a body, and one or more passages. The head is adapted to attach to the guide post, and the head comprises one or more intake channels adapted to supply lubricant to the saw guide. The body is connected to the head, and the body is located between adjacent ones of the saw blades. The body comprises first and second faces and one or more lubricant openings located on one or both of the first and second faces. One or more passages extend through the head and the body and connect each of the intake channels with one or more of the lubricant openings. For each of the passages, a flow control valve is located within the passage proximate to the lubricant opening. The flow control valve is adapted to differentially restrict a flow of lubricant out of the lubricant openings.

In still another embodiment, in a saw guide for a saw arbor guide assembly with an arbor, a plurality of saw blades rotating about the arbor, and a guide post, the saw guide comprises a head, a body, and one or more passages. The head is adapted to attach to the guide post, with the head comprising one or more intake channels adapted to supply lubricant to the saw guide. The body is connected to the head, with the body located between adjacent ones of the saw blades. The body comprises first and second faces, with the body further comprising a plurality of lubricant openings located on one or both of the first and second faces for supplying the lubricant to the saw blades. The passages extend through the head and the body and connect each of the intake channels with the lubricant openings, with the passages configured to carry lubricant from the one or more intake channels to the lubricant openings. For each of the lubricant openings, a flow control valve is located in the passage proximate to the lubricant opening to control a flow of lubricant through the lubricant opening. The flow control valves are configured to differentially control the flow of lubricant to the lubricant openings.

In yet another embodiment, the flow control valves are configured to differentially control the flow of lubricant through the lubricant openings.

In still yet another embodiment, a first one of the plurality of lubricant openings is located closer to an outside edge of the saw blade than the other ones of the plurality of lubricant openings.

In a further embodiment, the flow control valve located in the passage proximate to the first one of the plurality of lubricant openings is configured to provide a greater flow of lubricant through the first one of the plurality of lubricant openings than the flow of lubricant through the other ones of the plurality of lubricant openings.

In still a further embodiment, the plurality of lubricant openings is two lubricant openings.

In yet still a further embodiment, the saw guide comprises a pad attached to one or both of the first and second faces.

In another embodiment, the pad comprises an outer region and an inner region located within the outer region, wherein the outer region has a first thickness and the inner region has a second thickness, and wherein the first thickness is greater than the second thickness.

In still another embodiment, each of the flow control valves are configured to control the flow of lubricant to the lubricant openings to between 1.0 L/min. and 2.0 L/min.

In another embodiment, a saw arbor guide assembly comprises an arbor, a plurality of saw blades arranged on and rotating about the arbor, a guide post, and a plurality of saw guides attached to the guide post in a stacked configuration. Each of the saw guides comprises a head, a body, and one or more passages. The head is adapted to attach to the guide post, with the head comprising one or more intake channels adapted to supply lubricant to the saw guide. The one or more intake channels for each of the saw guides are aligned to allow for the lubricant to flow from one of the saw guides to an adjacent one of the saw guides. The body is connected to the head, with the body located between adjacent ones of the saw blades. The body comprises first and second faces, with the body further comprising a plurality of lubricant openings located on one or both of the first and second faces for supplying the lubricant to the saw blades. The passages extend through the head and the body and connect each of the intake channels with the lubricant openings, with the passages configured to carry lubricant from the one or more intake channels to the lubricant openings. For each of the lubricant openings, a flow control valve located in the passage proximate to the lubricant opening to control a flow of lubricant through the lubricant opening.

In yet another embodiment, the flow control valves are configured to differentially control the flow of lubricant through the lubricant openings.

In still another embodiment, the lubricant is supplied to the saw guides through an entry point proximate to a top or a bottom of the stacked configuration.

In still yet another embodiment, the flow control valves located on the saw guides closer to the entry point are configured to provide a different flow of the lubricant than the flow control valves located on the saw guides located further away from the entry point.

In a further embodiment, the flow control valves located on the saw guides closer to the entry point are configured to provide a lower flow of the lubricant than the flow control valves located on the saw guides located further away from the entry point.

In still a further embodiment, for each of the saw guides, a first one of the plurality of lubricant openings is located closer to an outside edge of the saw blade than the other ones of the plurality of lubricant openings.

In still yet another embodiment, the flow control valve located in the passage proximate to the first one of the plurality of lubricant openings is configured to provide a greater flow of lubricant through the first one of the plurality of lubricant openings than the flow of lubricant through the other ones of the plurality of lubricant openings.

In another embodiment, a method is provided for controlling the flow of a lubricant through a saw arbor guide assembly with an arbor, a plurality of saw blades rotating about the arbor, and a guide post. The method comprises providing a plurality of saw guides attached to the guide post in a stacked configuration. Each of the saw guides comprises a head, a body, and one or more passages. The head comprises one or more intake channels adapted to supply lubricant to the saw guide, the one or more intake channels for each of the saw guides aligned to allow for the lubricant to flow from one of the saw guides to an adjacent one of the saw guides. The body is connected to the head, with the body located between adjacent ones of the saw blades, the body comprising first and second faces, the body further comprising a plurality of lubricant openings located on one or both of the first and second faces for supplying the lubricant to the saw blades. The passages extends through the head and the body and connects each of the intake channels with the lubricant openings, with the passages configured to carry lubricant from the one or more intake channels to the lubricant openings. For each of the lubricant openings, a flow control valve is located in the passage proximate to the lubricant opening to control a flow of lubricant through the lubricant opening. The method further comprises supplying the lubricant to the plurality of saw guides through an entry point located proximate to a top or bottom of the stacked configuration. The method further comprises configuring the flow control valves on the saw guides such that the flow of lubricant out of each of the saw guides in the stacked configuration is substantially the same.

In yet another embodiment, the step of configuring the flow control valves on the saw guides comprises calibrating each of the flow control valves independently of each other.

In still yet another embodiment, the method further comprises configuring the flow control valves on each of the saw guides such that the flow of lubricant through the lubricant openings closer to an outside edge of the saw blades is greater than the flow of lubricant through the lubricant openings farther to the outside edge.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The invention will be described by reference to the detailed description of the embodiments and to the drawings thereof in which.

DETAILED DESCRIPTION OF THE INVENTION

Figure 1:
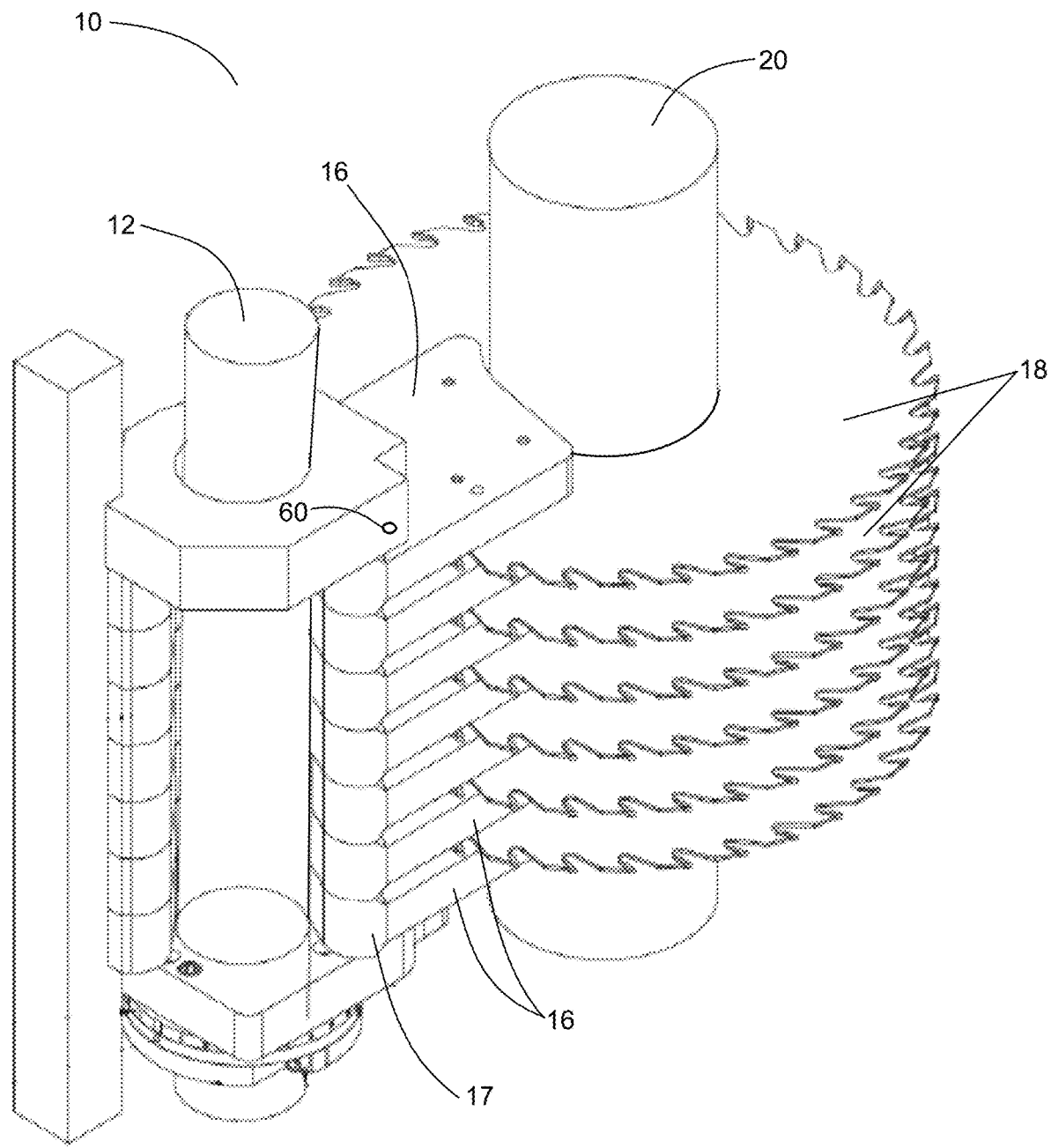
FIG. 1 depicts a saw arbor guide assembly in accordance with an embodiment of the invention.

Referring to FIG. 1, in one embodiment of the invention, a saw arbor guide assembly 10 comprises a guide post 12 and a plurality of saw guides 16. The guide post 12 may be substantially cylindrical, but other configurations are also possible. The plurality of saw guides 16 are arranged, generally in a stacked configuration 17, on the guide post 12. The location and spacing of the saw guides 16 are such so as to allow them to interact with one or more saw blades 18 that are attached to a rotating arbor 20 during cutting operations. In particular, the saw guides 16 are arranged such that each of the saw blades 18 travels in between adjacent ones of the saw guides 16 during operation.

The saw arbor guide assembly 10 depicted in FIG. 1 is a vertical single arbor (VSA) configuration (with a single set of saw guides 16 and saw blades 18 arranged vertically). It is understood that other configurations are also possible, such as a vertical double arbor (VDA) configuration (with two sets of saw guides 16 and saw blades 18 arranged vertically), a horizontal single arbor (HSA) configuration (with a single set of saw guides 16 and saw blades 18 arranged horizontally), a horizontal double arbor (HDA) configuration (with two sets of saw guides 16 and saw blades 18 arranged horizontally), and a quad configuration (with four sets of saw guides 16 and saw blades 18 arranged horizontally or in some other configuration).

FIGS. 2 to 9 depict one of the saw guides 16. It comprises a head 22 and a body 24 attached to the head 22. The head 22 is adapted to attach to the guide post 12, while the body 24 is adapted to, in conjunction with adjacent ones of the saw guides 16, interact with one or more of the saw blades 18. In other words, the saw blades 18 are configured to rotate between adjacent ones of the saw guides 16. The body 24 comprises opposing first and second faces 26, 28. One or both of the first and second faces 26, 28 preferably accommodates a substantially flat pad 30 for interacting with the saw blades 18. In one embodiment, the pad 30 may be made from Babbitt material; however, it is understood that the pad 30 may also be made from other materials suitable as a bearing/wear surface. For ease of illustration, FIGS. 2 to 9 only show a single one of the saw guides 16, but it is understood that the saw blade 18 may be located in between two of the saw guides 16 (for example, as shown in FIG. 1).

Figure 2:
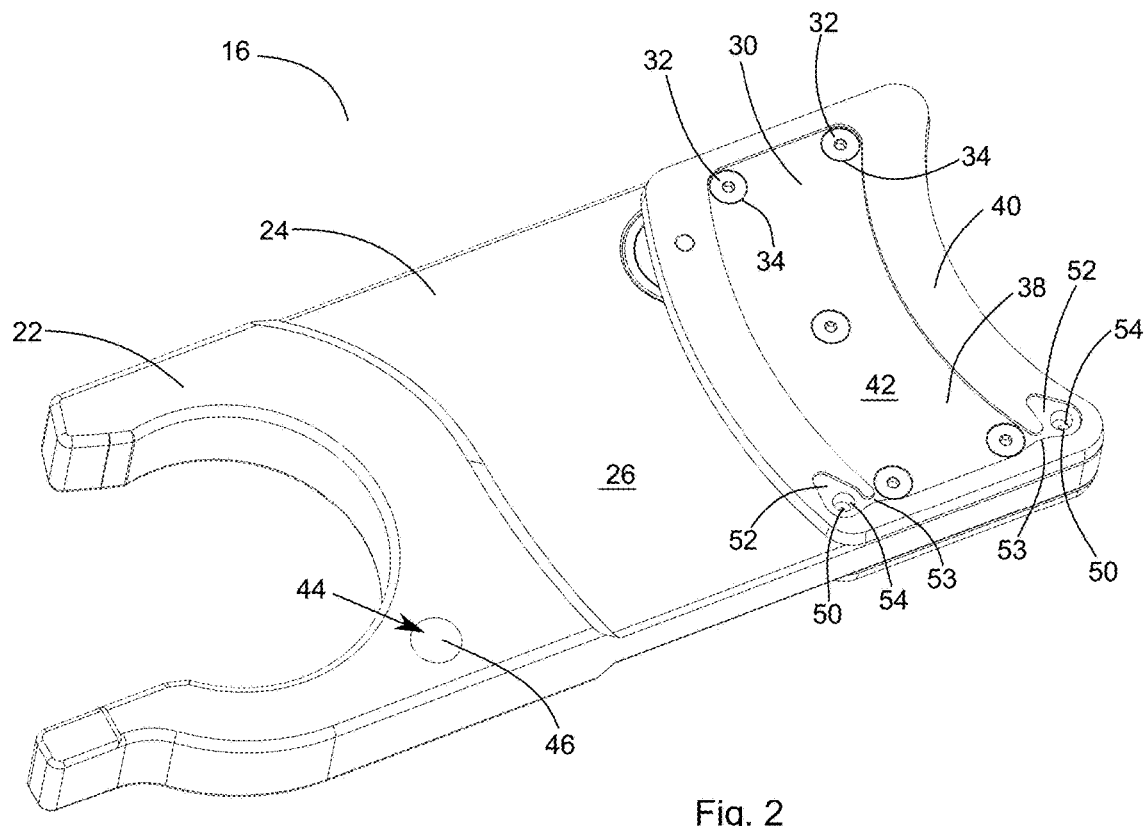
FIG. 2 is a top perspective view of a saw guide in accordance with an embodiment of the invention.
Figure 3:
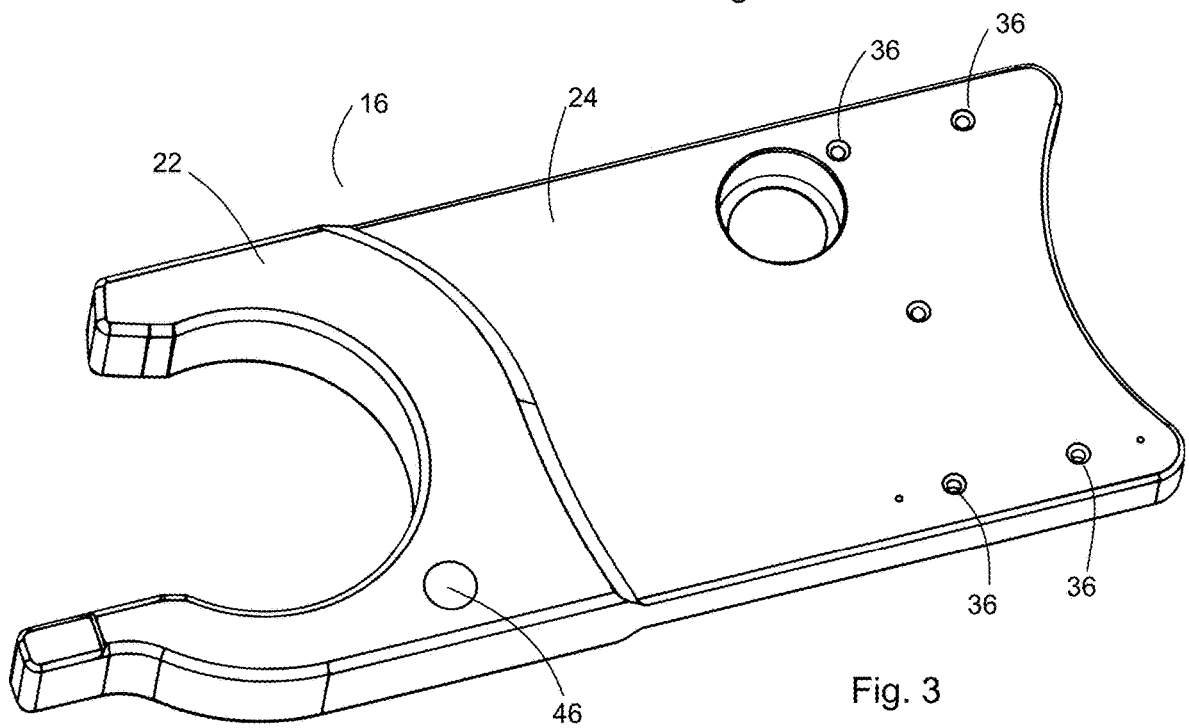
FIG. 3 is another top perspective view of the saw guide of FIG. 2, with the pad removed.

Referring to FIGS. 2 and 3, the pad 30 may be attached to the body 24 using one or more pad fasteners 32. The pad fasteners 32 may be bolts that extend through pad openings 34 on the pad 30 and fastener openings 36 on the body 24. However, it will be appreciated that other types of fasteners may be used for the pad fasteners 32 and that other methods for attaching the pad 30 to the body 24 (e.g. using adhesives, etc.) are also possible.

The pad 30 preferably comprises an inner region 38 generally surrounded by an outer region 40. Preferably, the inner region 38 is of a lesser thickness than the outer region 40, such that the inner region 38 forms a depression with respect to the outer region 40. This relative difference in thicknesses of the inner, outer regions 38, 40 provides a pocket 42 for accommodating a lubricant 44 used to cool the saw blade 18 as it rotates across the surface of the pad 30. The lubricant 44 may be air, oil, water, or a mixture of air, oil and/or water.

Referring to FIGS. 2 and 3, in one embodiment, the head 22 comprises one or more intake channels 46 for supplying the lubricant 44 to the saw guide 16. Preferably, the intake channels 46 extend substantially parallel to the guide post 12 and extend for an entire depth of the saw guide 16. In this manner, when the saw guides 16 are stacked on top of each other in the stacked configuration 17 (and attached to the guide post 12), the intake channels 46 for each of the saw guides 16 are preferably aligned with one another and form a common through-passage for the lubricant 44 to flow. This allows the lubricant 44 to flow from one of the saw guides 16 to another.

Furthermore, one or more passages 48 (shown in cross-section in FIG. 9 and in dotted lines in FIGS. 5 and 6) are formed within the saw guide 16 and extend from the intake channels 46. The passages 48 extends through the head 22 and into the body 24. One or more lubricant openings 50 are formed on one or both of the first face 26 and the second face 28. For ease of illustration, FIGS. 2 to 9 depict two lubricant openings 50 formed on the first face 26 and two lubricant openings 50 formed on the second face 28. However, it is understood that there may be greater or fewer numbers of the lubricant openings 50 and that they may be formed on only one of the first face 26 and the second face 28.

The passages 48 connect the intake channels 46 to the lubricant openings 50, thereby allowing the lubricant 44 flow from the intake channels 46 to the lubricant openings 50. The passages 48 may comprise a number of segments 49 in order to connect the intake channels 46 to the lubricant openings 50. By way of example only, in the embodiment shown in FIG. 8, the passage 48 may comprise a first segment 49a that extends between a first pair of lubricant openings 50a on the first face 26 and the second face 28, and a second segment 49b that extends between a second pair of lubricant openings 50b on the first face 26 and the second face 28. The passage 48 further comprises a third segment 49c extending between the intake channel 46 and the first segment 29a, and a fourth segment 49d extending between the first segment 29a and the second segment 29b. It is understood that other configurations for the segments 49 and the passages 48 are also possible. For example, alternatively, the passage 48 may comprise segments 49 that split or branch at some point in order to reach all of the lubricant openings 50.

Referring to FIG. 2, the lubricant openings 50 are preferably located under the outer region 40 of the pad 30. Furthermore, the outer region 40 preferably comprises cut-out portions 52 corresponding in location to the lubricant openings 50. The cut-out portions 52 preferably extend through the outer region 40 and allow the lubricant 44 to flow out of the lubricant openings 50. Preferably, at least a portion of the cut-out portions 52 also extends laterally into the inner region 38, thereby providing a path 53 for the lubricant 44 to flow into the pocket 42, although it is understood that other configurations are possible.

A flow control valve 54 is installed in the passages 48 at or proximate to each of the lubricant openings 50. The flow control valve 54 is configured to control the flow rate of lubricant 44 from the passages 48 to the outer region 40 and the inner region 42 of the pad 30. The flow control valve 54 may be a gate valve, a globe valve, a pinch valve, a diaphragm valve, a needle valve, or any other suitable type of valve. Preferably, each of the individual flow control valves 54 for each saw guide 16 may be calibrated independently of each other to provide for a different flow rate of lubricant 44, if desired. Alternatively, all of the flow control valves 54 for each saw guide 16 may be calibrated to provide for the same flow rate of lubricant 44.

Figure 4:
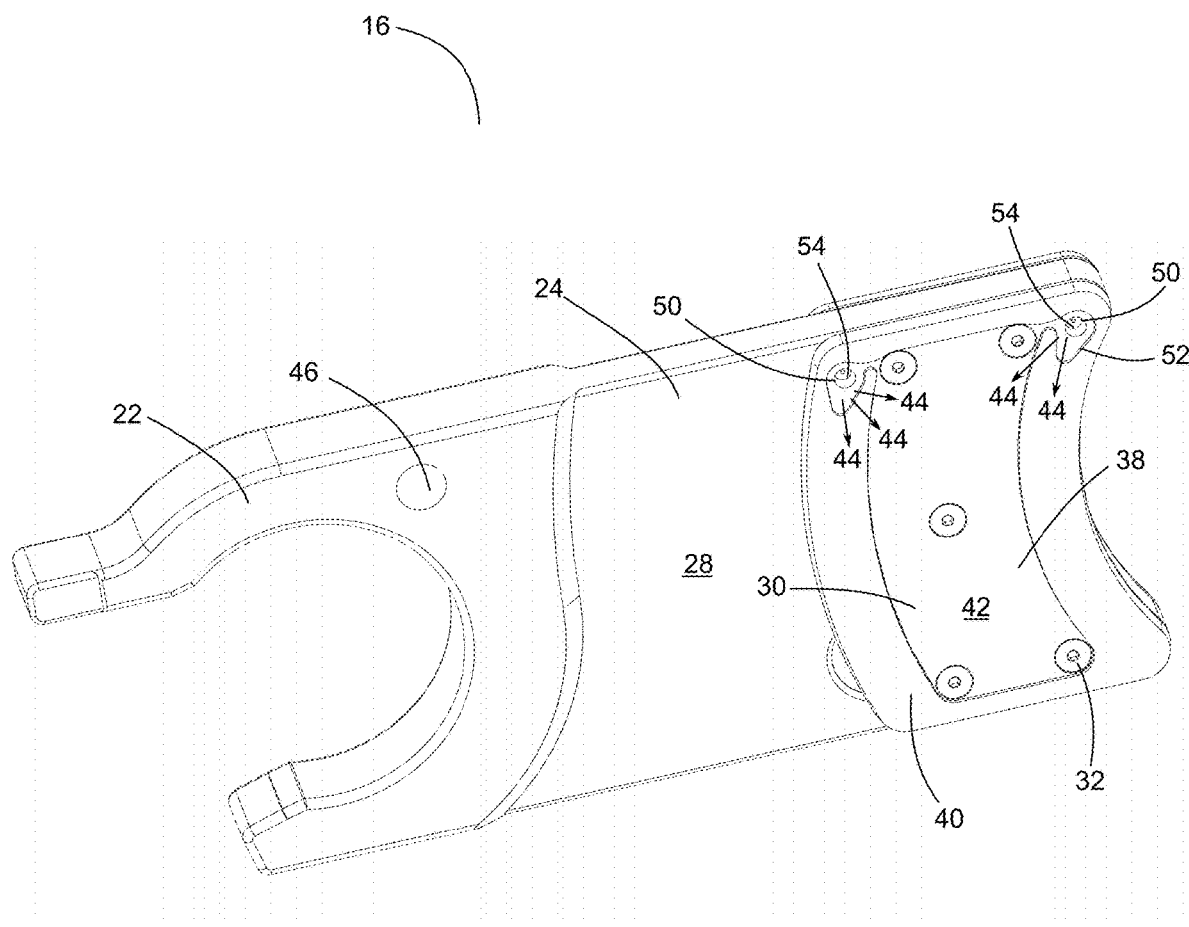
FIG. 4 is a bottom perspective view of the saw guide of FIG. 2.
Figure 5:
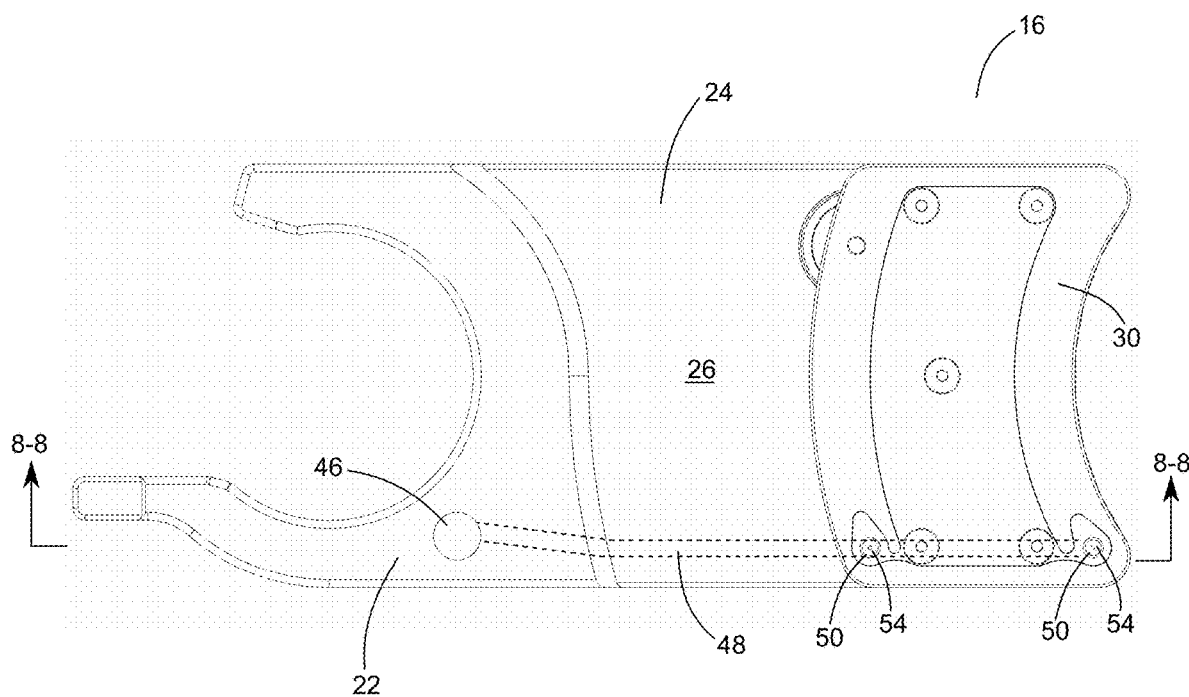
FIG. 5 is a top view of the saw guide of FIG. 2.
Figure 6:
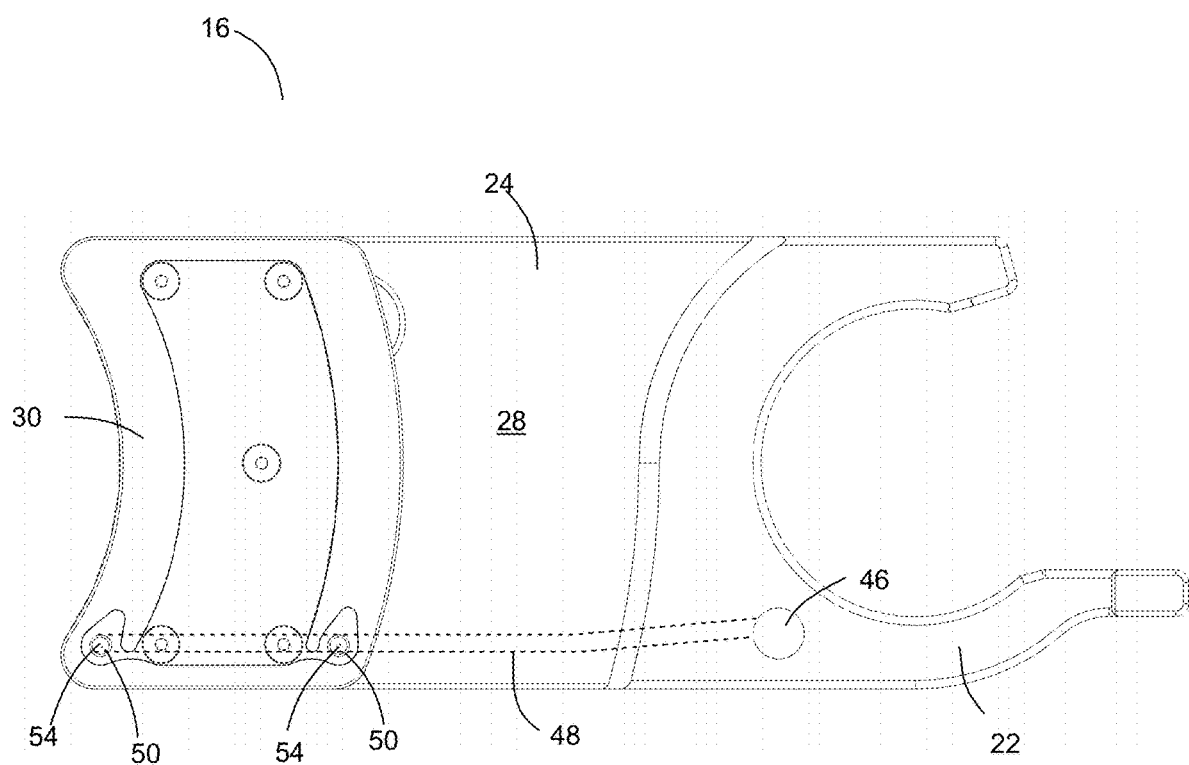
FIG. 6 is a bottom view of the saw guide of FIG. 2.
Figure 7:
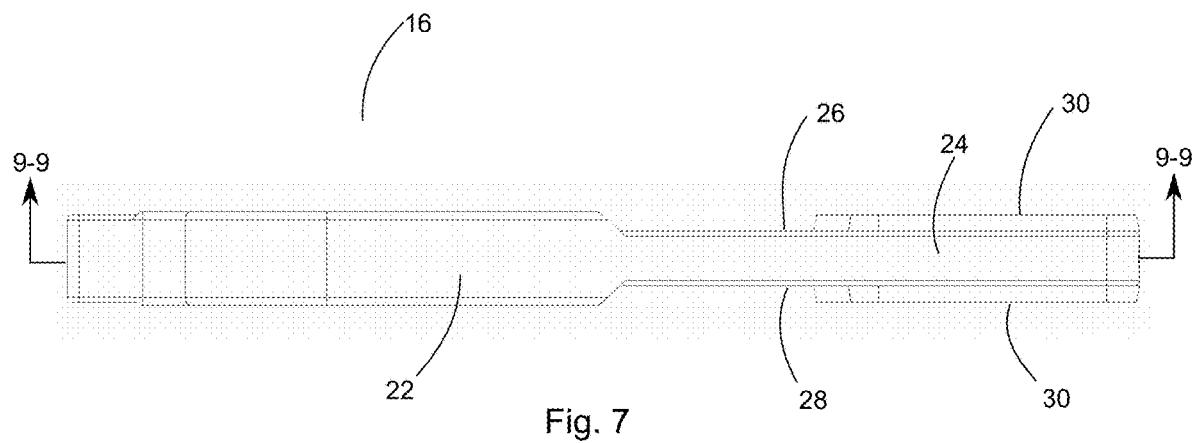
FIG. 7 is a side view of the saw guide of FIG. 2.
Figure 8:
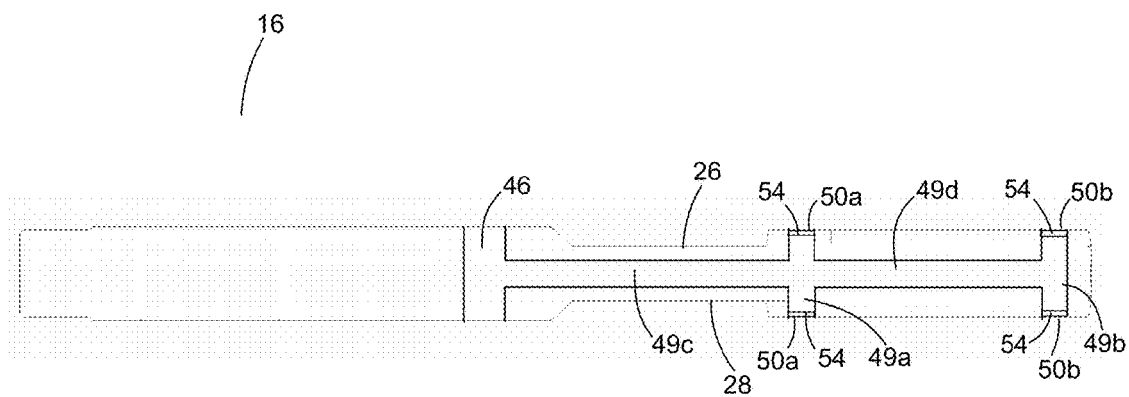
FIG. 8 is a sectional view of FIG. 7, taken along line 8-8 of FIG. 5.
Figure 9:
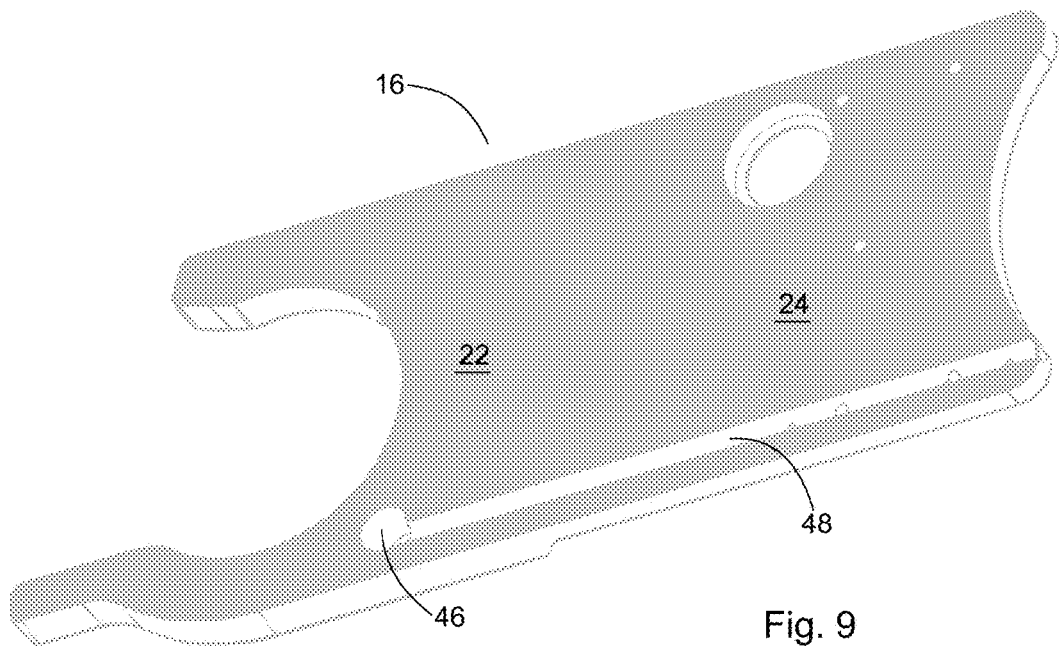
FIG. 9 is a sectional view of the saw guide of FIG. 2, taken along 9-9 of FIG. 8.

Referring to FIG. 4, the flow control valves 54 control and limit the flow of lubricant 44 out of the lubricant openings 50 and over the pad 30, whereby the lubricant 44 provides cooling and lubrication for the saw blades 18. By way of example only, the flow control valves 54 may be configured so that the flow rate for the lubricant 44 out each of the lubricant openings 50 and provided to each of the saw blades 18 may range from 1.0 to 2.0 liters/minute; however, other flow rates may be used, depending on the time of the year, the species of wood being cut, and other factors.

The use of the flow control valves 54 helps to provide a more even flow of lubricant 44 throughout the plurality of saw guides 16 in the saw arbor guide assembly 10. As described above, the saw guides 16 may be arranged in the stacked configuration 17, with the lubricant 44 being introduced to the saw guides 16 via an entry point 60 proximate to the top or bottom of the stack of saw guides 16. Without the flow control valves 54 in each of the saw guides 16, the saw guides 16 that are further away from the entry point 60 of the lubricant 44 into the saw arbor guide assembly 10 may experience a lower flow of the lubricant 44 than those closer to the entry point 60, because much of the lubricant 44 may already have been lost through the saw guides 16 located near the entry point 60. By using the flow control valves 54, the flow of lubricant 44 is restricted or controlled out of the saw guides 16 closer to the entry point 60, thereby allowing for greater amounts (and flow) of lubricant 44 out of the saw guides 16 (and to the saw blades 18) that are further away. In one scenario, the flow control valves 54 on the saw guides 16 closer to the entry point 60 may be configured to allow for a lower flow of the lubricant 44 compared to the flow control valves 54 on the saw guides 16 farther away from the entry point 60. This would reserve more of the lubricant 44 for the saw guides 16 located farther away from the entry point 60. In another scenario, the flow control valves 54 on each of the saw guides 16 are separately configured so that the flow of the lubricant 44 out of the each of the saw guides 16 is substantially the same, regardless of the distance of the saw guide 16 from the entry point 60.

In another example, excessive wear on the outer region 40 on one or more of the pads 30 on the saw guides 16 may allow an easier path for the lubricant 44 to escape from the pads 30, reducing the flow of available lubricant 44 to the saw blades 18 supported by unworn ones of the pads 30 in the saw arbor guide assembly 10.

In another example, machining tolerances of the saw guide 16 and the pads 30 may cause varying clearances between the saw blade 18 and the pad 30 to provide unequal flow of the lubricant 44 to the saw blades 18 in the saw arbor guide assembly 10.

In yet another example, during operation of the saw arbor guide assembly 10, one or more of the saw guides 16, the saw blades 18, or the pads 30 may experience catastrophic failure. In certain saw arbor guide assemblies 10, the design allows for continued operation during such circumstances. Missing or damaged ones of the saw guides 16, the saw blades 18, or the pads 30 would allow an unrestricted flow of the lubricant 44, reducing the available lubricant flow 44 to the saw guides 16 and the saw blades 18 in the rest of the saw arbor guide assembly 10.

In the previous three examples, the use of the flow control valves 54 restricts the flow of lubricant 44 to damaged, worn, or inconsistent ones of the saw guides 16 and/or the saw blades 18, ensuring that each of the saw guides 16 and the saw blades 18 receives sufficient flow of the lubricant 44.

Figure 10:
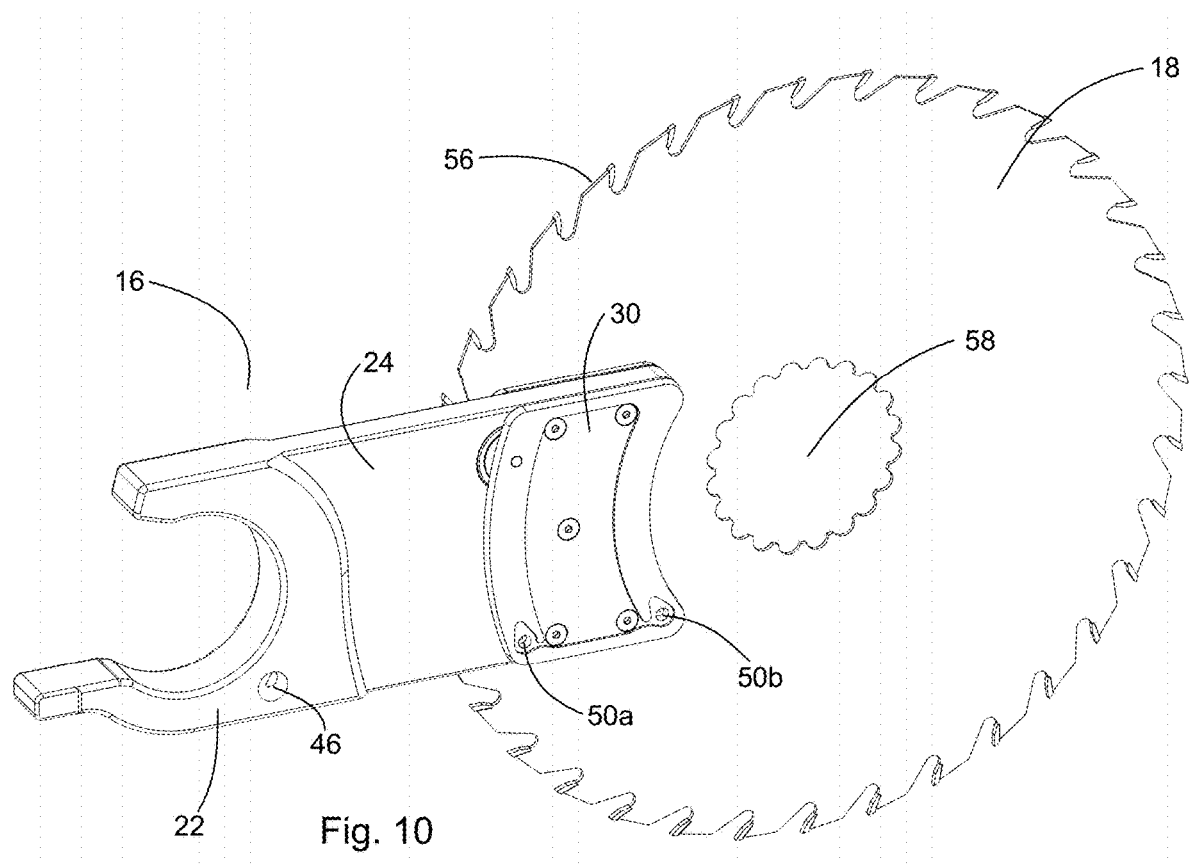
FIG. 10 depicts a saw guide and a saw blade in accordance with an embodiment of the invention.

Referring to FIG. 10, where there are more than one of the lubricant openings 50 (and therefore more than one of the flow control valves 54) on the saw guide 16, the location of the lubricant openings 50 may correspond to different relative locations of the saw blades 18 that interact with the saw guide 16. For example, referring to FIG. 10, the lubricant opening 50a that is closer to the head 22 will correspond to a location on the saw blade 18 that is closer to an outer edge 56 of the saw blade 18. In contrast, the lubricant opening 50b that is further from the head 22 will correspond to a location on the saw blade 18 that is closer to a center 58 of the saw blade 18.

During operation of the saw arbor guide assembly 10, when the saw blade 18 is rotating and cutting into wood, the temperature of the saw blade 18 is not even throughout its surface. In particular, it is believed that the portion of the saw blade 18 closer to the outer edge 56 is hotter (as compared with the center 58). Therefore, more cooling and lubrication may be needed closer to the outer edge 56.

Accordingly, in one embodiment, the flow control valve 54 located at or proximate to the lubricant opening 50a may be calibrated to allow for a greater flow of lubricant 44, as compared to the flow control valve 54 located at or proximate to the lubricant opening 50b. This would allow more lubricant 44 to be introduced to portions of the saw blade 18 that are closer to the outer edge 56 (where more cooling and lubrication may be needed).

Similarly, the flow control valves 54 located on different ones of the saw guides 16 may be calibrated as needed to provide for more cooling and lubrication to saw guides 16 in different locations along the guide post 12.

It will be appreciated by those skilled in the art that the preferred embodiments have been described in some detail but that certain modifications may be practiced without departing from the principles of the invention.

The invention claimed is:

1. A saw guide for a saw arbor guide assembly with an arbor, a plurality of saw blades rotating about the arbor, and a guide post, the saw guide comprising:
   a head adapted to attach to the guide post, wherein the head comprises one or more intake channels adapted to supply lubricant to the saw guide;
   a body connected to the head, wherein the body is located between adjacent ones of the plurality of saw blades, the body comprising:
      first and second faces;
      a plurality of lubricant openings located on both of the first and second faces for supplying the lubricant to the adjacent ones of the plurality of saw blades; and
      a plurality of fastener openings located on both of the first and second faces, each of the plurality of lubricant openings spaced apart from all of the plurality of fastener openings;
   two pads, wherein a first one of the two pads is attached to the first face, and wherein a second one of the two pads is attached to the second face, each of the two pads comprising:
      a plurality of cut-out regions, wherein each of the plurality of cut-out regions is aligned with, and partially surrounds, one of the plurality of lubricant openings to expose a portion of the first or second faces around the one of the plurality of lubricant openings; and
      a plurality of pad openings, each of the plurality of pad openings aligned with one of the plurality of fastener openings;
   a plurality of pad fasteners, wherein each of the plurality of pad fasteners is adapted to extend through one of the plurality of pad openings and one of the plurality of fastener openings;
   one or more passages extending from the one or more intake channels and extending through the head and the body, wherein the one or more passages are configured to carry the lubricant from the one or more intake channels, wherein each of the plurality of lubricant openings is connected with one of the one or more passages, and wherein each of the plurality of fastener openings is unconnected with any of the one or more passages; and
   for each of the plurality of lubricant openings, a flow control valve located in the one of the one or more passages proximate to the lubricant opening to control a flow of the lubricant through the lubricant opening;

wherein the flow control valves are configured to differentially control the flow of the lubricant to different ones of the plurality of lubricant openings.

2. The saw guide of claim 1, wherein a first one of the plurality of lubricant openings is located closer to an outside edge of the saw blade than other ones of the plurality of lubricant openings.

3. The saw guide of claim 2, wherein the flow control valve located in the one of the one or more passages proximate to the first one of the plurality of lubricant openings is configured to provide a greater flow of lubricant through the first one of the plurality of lubricant openings than the flow of lubricant through the other ones of the plurality of lubricant openings.

4. The saw guide of claim 3, wherein the plurality of lubricant openings is two lubricant openings.

5. The saw guide of claim 1, wherein each of the two pads comprises an outer region and an inner region located within the outer region, wherein the outer region has a first thickness and the inner region has a second thickness, and wherein the first thickness is greater than the second thickness.

6. The saw guide of claim 5, wherein all of the plurality of cut-out regions are located within the outer region and wherein all of the plurality of pad openings are located within the inner region.

7. The saw guide of claim 1, wherein each of the flow control valves are configured to control the flow of lubricant to the lubricant openings to between 1.0 L/min. and 2.0 L/min.

8. A saw arbor guide assembly comprising:
an arbor;
a plurality of saw blades arranged on and rotating about the arbor;
a guide post; and
a plurality of saw guides attached to the guide post in a stacked configuration, each of the saw guides comprising:
    a head adapted to attach to the guide post, wherein the head comprises one or more intake channels adapted to supply lubricant to the saw guide, wherein the one or more intake channels for each of the saw guides are aligned to allow for the lubricant to flow from one of the saw guides to an adjacent one of the saw guides;
    a body connected to the head, wherein the body is located between adjacent ones of the plurality of saw blades, the body comprising:
        first and second faces;
        a plurality of lubricant openings located on both of the first and second faces for supplying the lubricant to the adjacent ones of the plurality of saw blades; and
        a plurality of fastener openings located on both of the first and second faces, each of the plurality of lubricant openings spaced apart from all of the plurality of fastener openings;
    two pads, wherein a first one of the two pads is attached to the first face, and wherein a second one of the two pads is attached to the second face, each of the two pads comprising:
        a plurality of cut-out regions, each of the plurality of cut-out regions being aligned with, and partially surrounding, one of the plurality of lubricant openings to expose a portion of the first or second faces around the one of the plurality of lubricant openings; and
        a plurality of pad openings, each of the plurality of pad openings aligned with one of the plurality of fastener openings;
    a plurality of pad fasteners, wherein each of the plurality of pad fasteners is adapted to extend through one of the plurality of pad openings and one of the plurality of fastener openings;
    one or more passages extending from the one or more intake channels and extending through the head and the body, wherein the one or more passages are configured to carry the lubricant from the one or more intake channels, wherein each of the plurality of lubricant openings is connected with one of the one or more passages, and wherein each of the plurality of fastener openings is unconnected with any of the one or more passages; and
    for each of the plurality of lubricant openings, a flow control valve located in the one of the one or more passages proximate to the lubricant opening to control a flow of the lubricant through the lubricant opening, wherein the flow control valves are configured to differentially control the flow of the lubricant to different ones of the plurality of lubricant openings.

9. The saw arbor guide assembly of claim 8, wherein the lubricant is supplied to the plurality of saw guides through an entry point proximate to a top or a bottom of the stacked configuration.

10. The saw arbor guide assembly of claim 9, wherein the flow control valves located on the saw guides closer to the entry point are configured to provide a different flow of the lubricant than the flow control valves located on the saw guides located further away from the entry point.

11. The saw arbor guide assembly of claim 10, wherein the flow control valves located on the saw guides closer to the entry point are configured to provide a lower flow of the lubricant than the flow control valves located on the saw guides located further away from the entry point.

12. The saw arbor guide assembly of claim 11, wherein for each of the plurality of saw guides, a first one of the plurality of lubricant openings is located closer to an outside edge of the saw blade than the other ones of the plurality of lubricant openings.

13. The saw arbor guide assembly of claim 12, wherein the flow control valve located in the one of the one or more passages proximate to the first one of the plurality of lubricant openings is configured to provide a greater flow of the lubricant through the first one of the plurality of lubricant openings than the flow of the lubricant through other ones of the plurality of lubricant openings.

14. The saw arbor guide assembly of claim 8, wherein each of the two pads comprises an outer region and an inner region located within the outer region, wherein the outer region has a first thickness and the inner region has a second thickness, and wherein the first thickness is greater than the second thickness.

15. The saw arbor guide assembly of claim 14, wherein all of the plurality of cut-out regions are located within the outer region and wherein all of the plurality of pad openings are located within the inner region.

16. A method for controlling the flow of a lubricant through a saw arbor guide assembly with an arbor, a plurality of saw blades rotating about the arbor, and a guide post, the method comprising:
providing a plurality of saw guides attached to the guide post in a stacked configuration, each of the saw guides comprising:

a head comprising one or more intake channels adapted to supply the lubricant to the saw guide, the one or more intake channels for each of the saw guides aligned to allow for the lubricant to flow from one of the saw guides to an adjacent one of the saw guides;

a body connected to the head, wherein the body is located between adjacent ones of the plurality of saw blades, the body comprising:

first and second faces;

a plurality of lubricant openings located on both of the first and second faces for supplying the lubricant to the adjacent ones of the plurality of saw blades; and a plurality of fastener openings located on both of the first and second faces, each of the plurality of lubricant openings spaced apart from all of the plurality of fastener openings;

two pads, wherein a first one of the two pads is attached to the first face, and wherein a second one of the two pads is attached to the second face, each of the two pads comprising:

a plurality of cut-out regions, each of the plurality of cut-out regions being aligned with, and partially surrounding, one of the plurality of lubricant openings to expose a portion of the first and second faces around the one of the plurality of lubricant openings; and a plurality of pad openings, each of the plurality of pad openings with one of the plurality of fastener openings;

a plurality of pad fasteners, wherein each of the plurality of pad fasteners is adapted to extend through one of the plurality of pad openings and one of the plurality of fastener openings;

one or more passages extending from the one or more intake channels and extending through the head and the body, wherein the one or more passages are configured to carry the lubricant from the one or more intake channels, wherein each of the plurality of lubricant openings is connected with one of the one or more passages, and wherein each of the plurality of fastener openings is unconnected with any of the one or more passages; and for each of the plurality of lubricant openings, a flow control valve located in the one of the one or more passages proximate to the lubricant opening to control a flow of the lubricant through the lubricant opening;

supplying the lubricant to the plurality of saw guides through an entry point located proximate to a top or bottom of the stacked configuration; and configuring the flow control valves on the saw guides to differentially control the flow of the lubricant to different ones of the plurality of lubricant openings.

17. The method of claim 16, wherein the step of configuring the flow control valves on the plurality of saw guides comprises calibrating each of the flow control valves independently of each other.

18. The method of claim 16, further comprising the step of configuring the flow control valves on each of the plurality of saw guides such that the flow of the lubricant through the lubricant openings closer to an outside edge of the saw blades is greater than the flow of the lubricant through the lubricant openings farther from the outside edge.

\* \* \* \* \*